United States Patent [19]

Turgeon et al.

[11] Patent Number: 5,085,568
[45] Date of Patent: Feb. 4, 1992

[54] POUR HEAD SEAL ASSEMBLY FOR A MOLD FOR FORMING COMPOSITE ARTICLES

[75] Inventors: Michael Turgeon, Rochester; Jeffrey Kielinen, Epping, both of N.H.

[73] Assignee: Davidson Textron Inc., Dover, N.H.

[21] Appl. No.: 659,629

[22] Filed: Feb. 25, 1991

[51] Int. Cl.⁵ .................... B29C 39/10; B29C 39/24
[52] U.S. Cl. .................... 425/125; 249/91; 249/96; 264/46.4; 425/129.1; 425/571; 425/DIG. 47
[58] Field of Search .......... 264/46.4, DIG. 64; 249/121, 91, 93, 96; 425/4 R, 117, 121, 123, 125, 567, 568, 569, 570, 571, DIG. 47, 817 R, 129.1

[56] References Cited

U.S. PATENT DOCUMENTS

| | | | |
|---|---|---|---|
| 3,083,408 | 4/1963 | Bichl | 425/567 |
| 4,030,267 | 6/1977 | Arnaud | 264/46.6 |
| 4,033,710 | 7/1977 | Hanning | 425/543 |
| 4,743,188 | 5/1988 | Gray et al. | 425/123 |
| 4,781,554 | 11/1988 | Hendry | 425/4 R |
| 4,873,032 | 10/1989 | Kohlhase | 425/129.1 |

FOREIGN PATENT DOCUMENTS 1322736  7/1973  United Kingdom ............... 425/567

Primary Examiner—Jay H. Woo
Assistant Examiner—Khanh P. Nguyen
Attorney, Agent, or Firm—John P. Moran

[57] ABSTRACT

A pour head seal assembly for a mold including a mold cavity part and a lid, with a film layer against the inner surface of the lid and a preformed shell against the inner surface of the mold cavity part. The pour head seal assembly may be operatively mounted on either the lid or the mold cavity part, including a nozzle mounted through an opening formed in the selected element, with either the film layer or the preformed shell having an opening formed therein for mounting around the nozzle. A clamp plate collar is mounted on the inner end of the nozzle, adapted to clamp either the film layer or the preformed shell against an O-ring seal mounted on the adjacent inner lid or mold cavity surface to eliminate foam leakage around the nozzle.

11 Claims, 2 Drawing Sheets

POUR HEAD SEAL ASSEMBLY FOR A MOLD FOR FORMING COMPOSITE ARTICLES

This invention relates generally to molds for forming composite articles and, more particularly, to pour head seal assembly operatively connected to the mold lid or mold cavity part for sealing off the filling nozzle to eliminate foam leakage therearound.

BACKGROUND ART

Various proposals have been suggested to provide a closed mold cavity for maintaining foam precursors under pressure during the foaming process so as to eliminate foam leakage around the filling nozzle.

U.S. Pat. No. 4,030,267 discloses a mold packaging system wherein a lid carries an inlet duct with a ring of elastic material. When the lid is closed, a plug is selectively connected on the inlet duct to engage the ring to prevent the escape of foam from the mold cavity.

U.S. Pat. No. 3,354,408 discloses a charge fitting for a plastic molding apparatus which includes an elastomeric valve disk that engages a nozzle for injecting plastic material into a cavity between first and second mold parts. In this arrangement the nozzle is sealed as it is directing plastic into the mold apparatus. The fitting will seal the charge within the mold when the nozzle is removed therefrom. While suitable for its intended purpose, the molding apparatus does not include a preformed shell on one of the mold cavity parts. In such cases, a rear wall mounted pour head access port has to bridge the shell. The charge fitting in the U.S. Pat. No. 3,354,408 patent is not configured to address the problem of how to bridge such a preformed shell component during the molding process.

U.S. Pat. No. 4,033,710 discloses a fill nozzle arrangement for directing thermoplastic material into a pour mold cavity. The fill nozzle includes a pair of shutter jaws that are made of flexible material. The jaws close around an insert tube for injecting a foaming agent into the foam material during the molding process.

U.S. Pat. Nos. 4,303,720; 4,420,447 and 4,477,504 disclose processes for forming instrument panel composite structures in which an insert is supported on a lid for a mold cavity in which a skin is located. In these processes, the material is poured into the mold cavity when the lid is removed and the mold is enclosed to allow the foam precursors to expand and fill a foam cavity that will form a foam layer on the back side of the preformed shell of the composite structure.

U.S. Pat. No. 4,743,188 discloses an apparatus for sealing a pour head in a mold wherein a sleeve is integrally formed on the preformed shell and located within an access port formed through the wall of the mold cavity port through which a pour head extension is mounted. The latter is selectively sealingly clamped and unclamped with respect to the shell sleeve by an inflatable seal clamp which is formed as a surrounding annular ring with a pressurizable passage connected to a source of selectively applied pressure.

DISCLOSURE OF THE INVENTION

A general object of the invention is to provide an improved pour head seal apparatus wherein foam leakage around a filling nozzle is eliminated.

Another object of the invention is to provide an improved pour head seal apparatus which may be adapted to either a mold lid or a mold cavity part.

A further object of the invention is to provide a pour head seal apparatus including a cylinder-actuated CMIP head and filling nozzle having a clamp plate collar on the inner end thereof for confining either a Surlyn film layer or a preformed shell against a backing plate and O-ring mounted in a recess formed either in the mold lid, or in the wall of a mold cavity part, respectively, to eliminate foam leakage around the nozzle.

These and other objects and advantages will become more apparent when reference is made to the following drawings and accompanying description.

BEST MODE OF CARRYING OUT THE INVENTION

Figure 1:
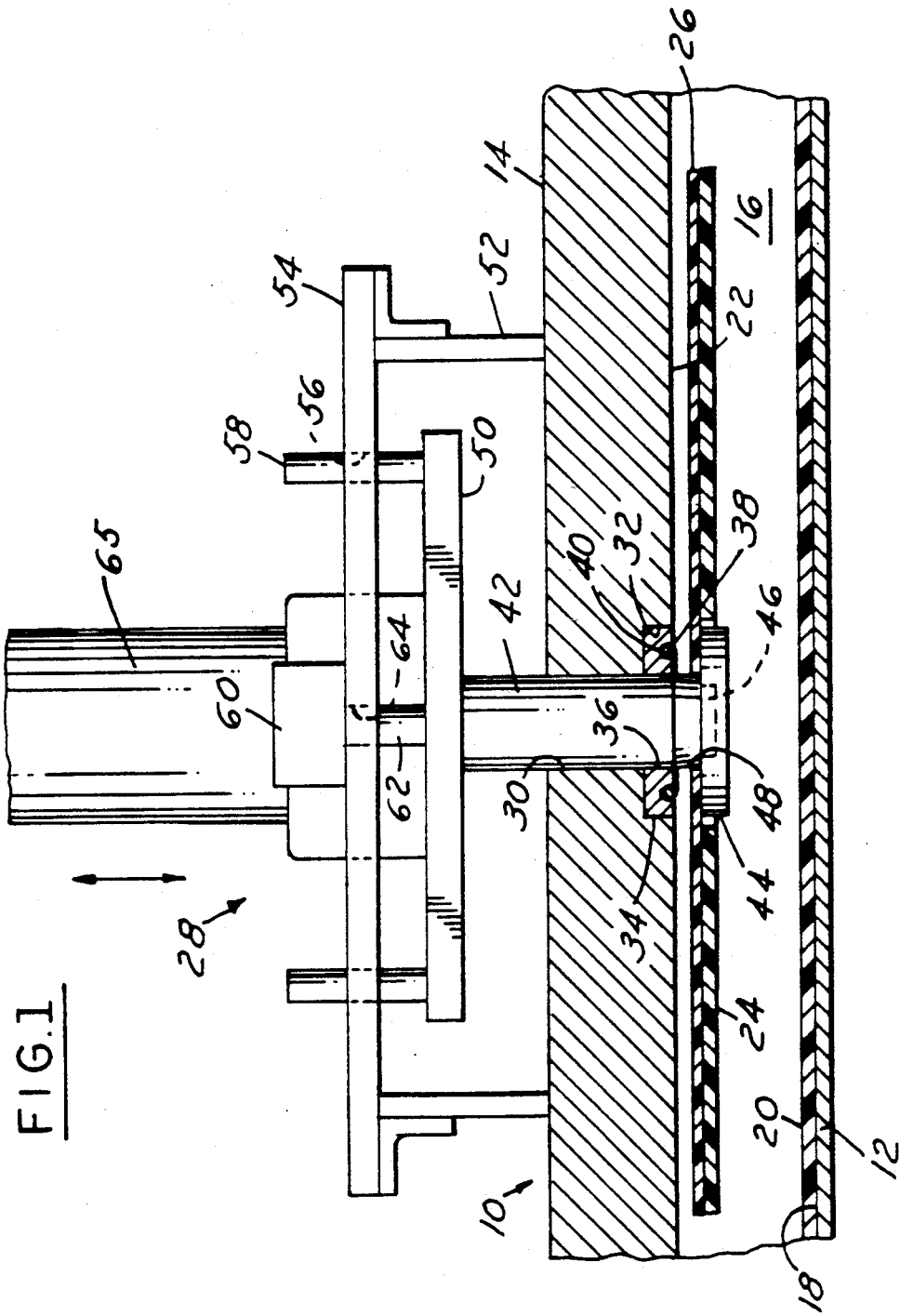
FIG. 1 is a cross-sectional view of a mold arrangement embodying the invention.

Referring now to the drawings in greater detail, FIG. 1 illustrates a mold assembly 10, including a mold cavity part 12 and a lid 14, which are joined to form a cavity 16 for the expansion of foam precursors in the known manner. The mold cavity part 12 has an inboard surface 18 thereon that supports a preformed shell 20 that serves to form the outer surface of a completed composite article (not shown).

The lid 14 has an inner surface 22 thereon that supportingly receives a removably mounted reinforcing insert 24 which can be manufactured of plastic material, if desired, by a process as set forth in U.S. Pat. No. 4,734,420, and loaded onto the lid 14. The insert 24 is covered by a layer 26 of a suitable plastic, such as Surlyn, bonded thereto.

The present invention embodies an improved pour head seal assembly 28 that will provide for the passage of foam precursors into the cavity 16 formed in the closed mold assembly 10 between the insert 24 and the preformed shell 20. The pour head seal assembly 28 includes a first diameter opening 30 formed through the lid 14, with a second larger diameter recess 32 formed in the inner surface 22 of the lid 14. A backing plate 34 is epoxied in place in the recess 32. An opening 36 is formed through the backing plate 34 of a diameter the same as, and aligned with, the first diameter opening 30. An O-ring 38 is mounted in a suitable annular groove 40 formed in the exposed surface of the backing plate 34.

Figure 2:
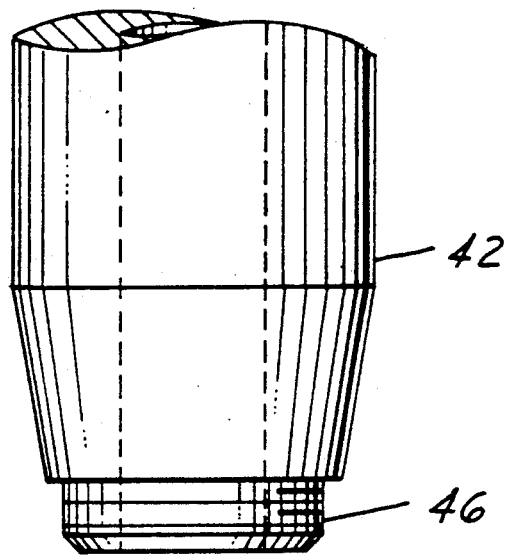
FIG. 2 is an enlarged side elevational view of a portion of the FIG. 1 structure.

The pour head seal assembly 28 further includes a nozzle 42 slidably mounted through the aligned openings 30 and 36. A clamp plate collar 44 is threadedly mounted on a threaded end 46 (FIG. 2) of the nozzle 42. As shown in FIG. 1, the film layer 26 includes an opening 48 which mounts around the nozzle 42 between the clamp plate collar 44 and the O-ring 38.

A head mounting plate 50 is mounted on the outer end of the nozzle 42, with a predetermined stroke distance, e.g., 3/16 inch, provided between the head mounting plate 50 and the lid 14. A plurality of fixed ribs 52 are mounted on the outer top surface of the lid 14. A fixed cylinder mounting and guide plate 54, in turn, is supported on the ribs 52. A plurality of openings 56 are formed through the plate 54, and guide rods 58 mounted on the top surface of the head mounting plate 50 are slidably mounted therethrough.

A pancake-type cylinder 60 is mounted on the mounting plate 54, with a piston 62 extending therefrom through an opening 64 in the plate 54 and secured to the head mounting plate 50. A source of supply of foam precursors (not shown) includes a closed mold injection pour or CMIP head 65 mounted on the head mounting plate 50 adjacent the cylinder 60 and the plate 54, in axial alignment with the nozzle 42, so as to selectively supply the foam precursors therethrough into the cavity 16.

In operation, actuating the cylinder 60 to raise the head mounting plate serves to lift the latter, along with the CMIP head 65 and the nozzle 42. The resultant movement lifts the associated clamp plate collar 44 and clamps the Surlyn film 26 against the O-ring 38, to thereby eliminate any foam leakage therepast and thus reduce cleaning time and contribute to a reduction of cycle time and improved operating procedure.

Figure 3:
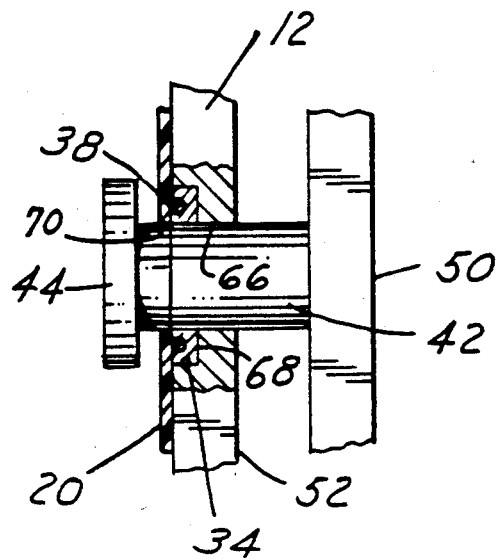
FIG. 3 is a fragmentary cross-sectional view of a mold arrangement including an alternate embodiment of the invention.

As an alternate embodiment, the pour head seal assembly may be operatively connected through an opening 66 in the mold cavity part 12, rather than through the opening 30 in the lid 14, as shown in FIG. 3, with the backing plate 34 mounted in a recess 68 formed in the wall of the mold cavity part 12, and the ribs 52 mounted on the outer surface of the mold cavity part 12. In this instance, it is the preformed shell 20 which is formed to include an opening 70 at a predetermined location for mounting around the nozzle 42, between the clamp plate collar 44 and the O-ring 38. In this embodiment, the lid 14 is solid and includes a reinforcing insert 24 detachably mounted thereon, with peripheral edge thereof confined between the lid and the adjacent end surface of the mold cavity part 12.

INDUSTRIAL APPLICABILITY

It should be apparent that the invention provides an improved pour head seal assembly 28 which will effectively eliminate foam leakage around the filling nozzle.

It should also be apparent that the lid and associated reinforcing insert may have any shape warranted by the backside of the article being formed, and that the inner surface of the mold cavity part and the associated preformed shell may have any shape warranted by the outer surface of the article being formed in the cavity therebetween.

It should be further apparent that the location of the opening 66 in the wall of the mold cavity part is selected such that the adjacent opening 70 in the preformed shell is in a location for a typical predetermined opening which is required in the finished composite article, such as for heater vents or instrument dials mounted in instrument panel openings.

While but two embodiments of the invention have been shown and described, other modifications are possible within the scope of the following claims.

The embodiments of the invention in which an exclusive property or privilege is claimed are defined as follows:

1. For use with a mold including a cavity part and a lid joined together to form a cavity with a mold surface, a preformed shell supported by the mold surface, and a film layer supported by said lid, a pour head seal assembly comprising a first opening formed through one of the cavity part and the lid, a recess formed around said opening within said cavity, a backing ring mounted in said recess, an O-ring seal mounted on said backing ring, a nozzle slidably mounted through said opening and said backing ring and having an end thereof extended into said cavity, a clamp plate collar mounted on the end of said nozzle within said cavity, a source of supply of foam precursors operatively connected to said nozzle exterior of said mold, a second opening formed in one of said preformed shell and said film layer for mounting around said nozzle intermediate said clamp plate collar and said O-ring seal, and cylinder means operatively connected to said nozzle for selectively moving said clamp plate collar toward said O-ring seal to confine said one of said preformed shell and said film layer therebetween to eliminate foam leakage around said nozzle.

2. The pour head seal assembly described in claim 1, wherein said first opening and said recess are formed in the wall of said lid, said second opening is formed in said film layer, and it is said film layer that is selectively confined between said clamp plate collar and said O-ring seal.

3. The pour head seal assembly described in claim 1, wherein said first opening and said recess are formed in the wall of said cavity part, said second opening is formed in said preformed shell, and it is said preformed shell that is selectively confined between said clamp plate collar and said O-ring seal.

4. The pour head seal assembly described in claim 1, and a reinforcing insert removably mounted to said lid and to which said film layer is bonded.

5. The pour head seal assembly described in claim 1, wherein said film layer is composed of a suitable plastic material.

6. The pour head seal assembly described in claim 1, and a head mounting plate mounted on the outer end of said nozzle.

7. The pour head seal assembly described in claim 6, wherein said source of supply of foam precursors includes a closed mold injection pour head mounted on said head mounting plate.

8. The pour head seal assembly described in claim 6, and a plurality of ribs secured to the outer surface of one of said lid and said cavity part, and a cylinder mounting and guide plate secured to said ribs, said cylinder means being mounted on said cylinder mounting and guide plate.

9. The pour head seal assembly described in claim 8, and a plurality of openings formed in said cylinder mounting and guide plate, and a plurality of guide rods mounted on said head mounting plate for sliding cooperation with said plurality of openings.

10. The pour head seal assembly described in claim 8, wherein said plurality of ribs are secured to the outer surface of said lid.

11. The pour head seal assembly described in claim 8, wherein said plurality of ribs are secured to the outer surface of said cavity part.

* * * * *